US010501037B2

(12) United States Patent
Akif et al.

(10) Patent No.: US 10,501,037 B2
(45) Date of Patent: Dec. 10, 2019

(54) PEDESTRIAN PROTECTION DEVICE FOR A MOTOR VEHICLE

(71) Applicant: Bayerische Motoren Werke Aktiengesellschaft, Munich (DE)

(72) Inventors: Oeztzan Akif, Munich (DE); Gerhard Fichtinger, Grasbrunn (DE); Wilhelm Riedl, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/625,646

(22) Filed: Jun. 16, 2017

(65) Prior Publication Data
US 2017/0282823 A1 Oct. 5, 2017

Related U.S. Application Data

(63) Continuation of application No. PCT/EP2015/078889, filed on Dec. 7, 2015.

(30) Foreign Application Priority Data

Dec. 18, 2014 (DE) .................. 10 2014 226 363

(51) Int. Cl.
*B60R 19/34* (2006.01)
*B60R 19/18* (2006.01)
(Continued)

(52) U.S. Cl.
CPC ............ *B60R 19/34* (2013.01); *B60R 19/023* (2013.01); *B60R 19/18* (2013.01); *B60R 19/26* (2013.01);
(Continued)

(58) Field of Classification Search
CPC ....... B60R 19/34; B60R 19/023; B60R 19/18; B60R 19/26; B60R 19/28; B60R 21/34; B64C 1/062; F16F 7/125
(Continued)

(56) References Cited

U.S. PATENT DOCUMENTS 3,718,326 A * 2/1973 Ristau .................... B60R 19/26
114/219
3,756,643 A * 9/1973 Weed ...................... B60R 19/26
267/139

(Continued)

FOREIGN PATENT DOCUMENTS

CN 2521093 Y 11/2002
CN 102173291 A 9/2011
(Continued)

OTHER PUBLICATIONS

International Search Report (PCT/ISA/210) issued in PCT Application No. PCT/EP2015/078889 dated Feb. 3, 2016 with English translation (8 pages).
(Continued)

*Primary Examiner* — Joseph D. Pape
(74) *Attorney, Agent, or Firm* — Crowell & Moring LLP

(57) ABSTRACT

A pedestrian protection device for a motor vehicle, for example for a motor vehicle front end or a motor vehicle rear end, has a bumper crossmember with a deformation element arranged on the outer side thereof, i.e. the side directed towards the front. In particular, the deformation element is arranged between a bumper skin and the bumper crossmember. The deformation element has a first element and a second element which are displaceable relative to one another in the event of a collision. Furthermore, the pedestrian protection device has a locking mechanism which, in dependence on a displacement speed, and thus on a collision speed, of the motor vehicle, and while exploiting a mass
(Continued)

inertia of a locking element which is arranged or mounted on the first element or the second element, is adjustable between a locked state in which a displacement of the first element relative to the second element is at least partially prevented by, in particular, positive engagement, and an unlocked state in which a displacement of the first element is allowed.

20 Claims, 4 Drawing Sheets

(51) Int. Cl.
　　*B60R 19/28*　　(2006.01)
　　*B60R 21/34*　　(2011.01)
　　*F16F 7/12*　　(2006.01)
　　*B60R 19/30*　　(2006.01)
　　*B60R 19/02*　　(2006.01)
　　*B60R 19/26*　　(2006.01)
　　*B60R 19/00*　　(2006.01)
(52) U.S. Cl.
　　CPC .............. *B60R 19/28* (2013.01); *B60R 19/30* (2013.01); *B60R 21/34* (2013.01); *F16F 7/125* (2013.01); *B60R 2019/007* (2013.01); *B60R 2019/186* (2013.01); *B60R 2019/262* (2013.01); *B60R 2019/268* (2013.01); *F16F 7/121* (2013.01)
(58) Field of Classification Search
　　USPC .................... 293/132, 133, 135, 136, 137
　　See application file for complete search history.

(56) References Cited

U.S. PATENT DOCUMENTS

| | | | | |
|---|---|---|---|---|
| 3,899,047 A | * | 8/1975 | Maeda | ............ B60R 19/34 188/374 |
| 5,884,959 A | * | 3/1999 | Hillen | ............ B60R 19/36 188/276 |
| 7,070,217 B2 | * | 7/2006 | Longo | ............ B60R 19/34 293/132 |

FOREIGN PATENT DOCUMENTS

| | | |
|---|---|---|
| CN | 103507734 A | 1/2014 |
| DE | 297 00 017 U1 | 2/1997 |
| DE | 197 00 022 A1 | 7/1998 |
| DE | 10 2010 054 641 A1 | 6/2012 |
| DE | 10 2011 017 512 A1 | 10/2012 |
| DE | 10 2012 112 636 A1 | 7/2014 |
| EP | 2 266 846 A2 | 12/2010 |
| JP | 10-109605 A | 4/1998 |
| SU | 1574497 A1 | 6/1990 |
| WO | WO 93/00232 A1 | 1/1993 |

OTHER PUBLICATIONS

German-language Written Opinion (PCT/ISA/237) issued in PCT Application No. PCT/EP2015/078889 dated Feb. 3, 2016 (6 pages).
Chinese-language Office Action issued in counterpart Chinese Application No. 201580058836.X dated Nov. 30, 2018 with English translation (18 pages).

* cited by examiner

PEDESTRIAN PROTECTION DEVICE FOR A MOTOR VEHICLE

CROSS REFERENCE TO RELATED APPLICATIONS

This application is a continuation of PCT International Application No. PCT/EP2015/078889, filed Dec. 7, 2015, which claims priority under 35 U.S.C. § 119 from German Patent Application No. 10 2014 226 363.8, filed Dec. 18, 2014, the entire disclosures of which are herein expressly incorporated by reference.

This application contains subject matter related to U.S. application Ser. No. 15/625,621, entitled "Deformation Structure, in Particular for Pedestrian Protection for a Motor Vehicle" filed on Jun. 16, 2017.

BACKGROUND AND SUMMARY OF THE INVENTION

The present invention relates to a pedestrian protection device for a motor vehicle having a bumper covering and a bumper transverse support, between which a deformation element is arranged.

A known front end of a motor vehicle has, for example, a bumper transverse support, which is fastened at forward ends of longitudinal supports, and a bumper covering. A soft foam, which can be deformed at a comparatively low load level, is arranged between the bumper covering and the bumper transverse support for the protection of pedestrians. The soft foam is arranged to protect a pedestrian under certain circumstances from a direct immediate collision with a hard rigid structure, such as the bumper transverse support.

Furthermore, there is a requirement that the vehicle remain free of damage in the event of a collision in a very low speed range of, for example, up to 4 km/h, in which the pedestrian protection is not relevant because of the low speed.

In the case of a slightly higher speed, which is also not yet relevant to the pedestrian protection, there further is the requirement that damage in the event of a collision be as minor as possible and that, for example, a radiator structure situated in the front end region of the vehicle, not be damaged.

In the case of a collision at a comparatively high speed, which is no longer relevant to a pedestrian protection, there is an emphasis on the design of the motor vehicle and its crash structure to provide occupant protection. For this purpose, the vehicle front or a front end of the vehicle is designed such that it deforms in an energy-absorbing manner over a specified deforming distance.

The various requirements partly conflict with one another and require a comparatively long vehicle overhang at the vehicle front and, therefore, have a higher weight and a disadvantageous influence on the driving dynamics.

For solving the conflicting objectives arising therefrom, a bumper arrangement having a transverse support was suggested in German Patent document DE 102010054641 A1, which is fastened to the vehicle body by way of crash boxes. A pedestrian protection element for a soft impact of a pedestrian is constructed in the driving direction in front of the transverse support. In addition, a swivelable energy absorption element is provided, which can be swiveled in front of the pedestrian protection element and thereby permits an increased energy absorption in the event of collisions in which a higher collision energy absorption capacity of the crash structure of the motor vehicle is required.

German Patent document DE 102012112636 A1 also shows a bumper arrangement having a bumper transverse support and a pedestrian protection element, which can be switched by way of an actuator from a rigid state to a comparatively soft state, which serves a pedestrian protection.

German Patent documents DE 102010054641 A1 and DE 102012112636 A1 have in common that a crash or pre-crash sensor system is required, in which case, on the basis of the output signals of the sensor system, a switching-over can take place between a hard rigid state of the crash structure with a high collision energy absorption capacity and a soft state of the crash structure with a lower collision absorption capacity for the benefit of the pedestrian protection.

It is therefore an object of the present invention to create a pedestrian protection device which has a simple construction and functions independently of a sensor system and an actuator respectively.

This and other objects are achieved by a pedestrian protection device for a motor vehicle in accordance with embodiments of the invention.

A pedestrian protection device for a motor vehicle, for example, for a motor vehicle front or a motor vehicle rear, has a bumper transverse support, on whose outer side, i.e. the side oriented toward the front or to a vehicle skin (front side), a deformation element is arranged. In particular, the deformation element, i.e. particularly a deformation region of the deformation element, is arranged between a bumper covering, which forms the vehicle skin, and the bumper transverse support. The deformation element has a first element and a second element, which can be displaced relative to one another in the event of a collision. The pedestrian protection device further has a latching mechanism which, as a function of a displacement speed (and thereby of a collision speed of the motor vehicle), while utilizing a mass inertia of a latching element, which is arranged or mounted on the first element or the second element, can be adjusted between a latched state, in which a displacement of the first element relative to the second element is prevented at least partly by, in particular, a form-fitting engagement (for example, in an indentation such as a recess, or in a step), and an unlatched state, in which a displacement of the first element is permitted.

The term "bumper transverse support" can include any transverse support in the region of the motor vehicle front end or of the motor vehicle rear end.

As a result, no collision sensor system and no actuator system are required for controlling a latching of the latching mechanism. The deformation element can thereby be switched by simple means while utilizing the mass inertia, between a soft state, in which a relative displacement between the first element and the second element is permitted, and a rigid state, in which a relative displacement between the first element and the second element is prevented, as a function of the displacement speed, which is the result of the collision.

A relative displacement between the first element and the second element in this case essentially takes place in the longitudinal direction of the motor vehicle, which is usually also a main direction in the event of a frontal collision of the motor vehicle. The latching mechanism according to the present invention, independently of a collision sensor system, acts automatically by utilizing the mass inertia of the latching element.

According to a preferred further development, the latching mechanism is latched below a collision speed threshold value, and therefore a displacement speed threshold value, and is unlatched when a collision speed threshold value is reached.

The structure of the front end or of the rear end of the motor vehicle can therefore be constructed to be sufficiently rigid for a relatively low speed, so that no structural damage, for example, of the bumper covering or the like, will occur as a result of excessive deforming. Repair costs can thereby be minimized in the event of collisions at a very low speed, for example, in the case of so-called trivial damage when parking, and can be limited merely to the touching-up, for example, of paint damage.

Above the collision speed threshold value that is relevant to a pedestrian protection, the latching mechanism is unlatched, and the deformation element can be changed in its length by means of a comparatively low force for the protection of pedestrians, i.e. can be mutually pushed together by a relative displacement of the first element and the second element.

According to a preferred further development of the pedestrian protection device of the present invention, the latching element is prestressed via a spring device or can be prestressed via the spring device. For example, in the case of a displacement of the first element relative to the second element, the latching element can be engaged or latched in an indentation of the second element such that a further displacement of the first element relative to the second element is prevented.

As a result of the engagement of the latching element in the indentation, a form-locking connection takes place between the first element and the second element, so that a relative displacement between the first element and the second element will no longer be possible. In contrast, the spring device is advantageous in that an engagement of the latching element with the indentation is reliably established and maintained.

In this case, the spring device is preferably essentially relaxed in an idle state, i.e. in a state in which no collision load acts upon the deformation element.

This has the advantage that the spring device does not lose its spring tensioning force in the normal condition.

As a result, the latching mechanism preferably has a contact surface by way of which the latching element can be moved against the spring force of the spring device and can thereby be prestressed, before the latching element reaches the indentation.

In other words, the collision load is utilized for a prestressing of the spring device.

The latching element, the spring device and the indentation are preferably constructed in an interacting manner such that, in the case of a slow displacement of the first element relative to the second element, the latching element engages in the indentation and, in the case of a fast displacement of the first element relative to the second element, the latching element does not engage in the indentation.

As a result, an automatic mechanism is created which utilizes only the mass inertia of the latching element for its function. Accordingly, an engaging takes place at a low displacement speed and therefore a low collision speed, and the deformation element thus works in a rigid manner. At the fast displacement speed and therefore the fast collision speed, the latching element does not engage—in the case of the fast displacement, the latching element slides particularly over and beyond the indentation—and a further displacement between the first element and the second element is made possible, whereby the deformation element as a whole will be soft.

The spring device may additionally be equipped with a damping device, which appropriately dampens movement of the latching element. An engaging/non-engaging of the latching element can thereby be appropriately controlled.

Furthermore, according to the pedestrian protection device of the present invention, the deformation element is adapted such that, in a latched condition of the latching mechanism, it can absorb collision energy by plastic deforming and/or brittle failure of the deformation element over a predefined deformation distance. Such a deformation distance may, for example, amount to 60 mm to 110 mm.

Depending on the collision load and therefore the speed during the collision, the deformation structure can therefore react completely rigidly and transmit the collision load to the crash structure of the vehicle situated behind it, or a load threshold value of the latched deformation element is exceeded and it is deformed and can therefore absorb collision energy for the protection of other components and of the vehicle occupants.

The deformation element may have a length of from 50 to 150 mm. Preferably, the deformation element may have a length of between 70 and 110 mm.

The first element can preferably be moved relative to the second element in an unlatched state of the deformation element over a distance of, for example, 60 to 110 mm.

The first element may be a cylindrical element, which can be displaced in a corresponding guide of the second element. The latching element may be mounted on the first element or on the second element.

According to an alternative embodiment of the present invention, the first element—or the second element—may have an elastic deformable wall, which forms the spring device, particularly with a free end, wherein the free end forms the latching element.

The free end of the deformable wall can be engaged with an indentation in the second element—or in the first element.

The free end of the deformable wall can be prestressed during a displacement along a contact surface on the second element—or on the first element.

The first element—or the second element—may particularly have two opposite elastic deformable walls, which are constructed on opposite sides of the first element—or of the second element. In this case, the two walls may, in particular, be arranged symmetrically with respect to one another. The two walls may be deformable in opposite transverse directions.

The first element—or the second element—may also have three, four, or more elastically deformable walls, as described above.

Above-described further developments of the invention, to the extent possible and meaningful, can be arbitrarily combined with one another.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, embodiments of the present invention will be described with reference to FIGS. 1 to 9.

FIGS. 1 to 4 show a pedestrian protection device for a motor vehicle according to a first embodiment of the present invention.

Figure 1:
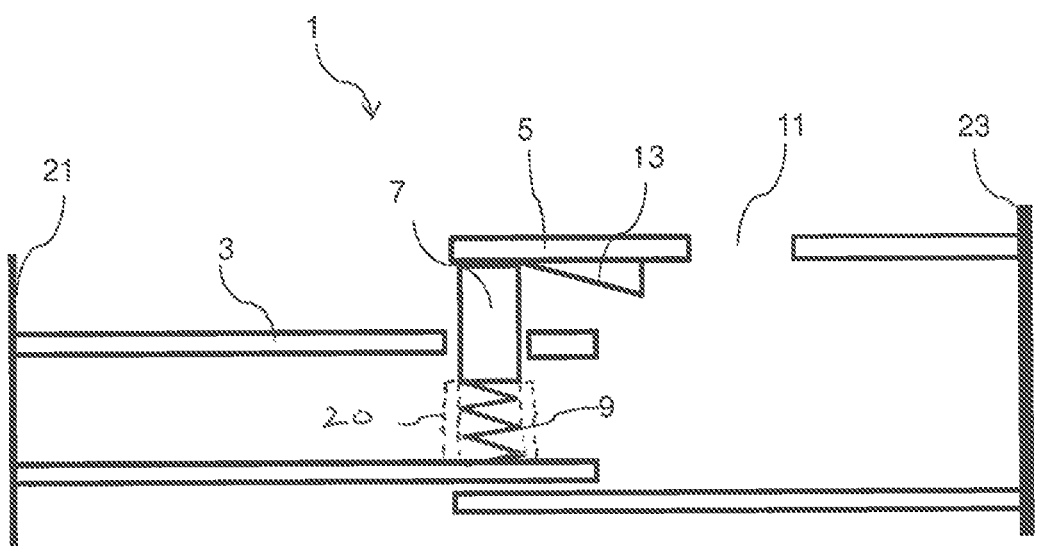
FIG. 1 is a schematic view of a pedestrian protection device according to a first embodiment of the present invention.

The pedestrian protection device 1 is mounted on a front end of the motor vehicle, particularly a motor vehicle front, having a transverse bumper support 23. In particular, the pedestrian protection device is arranged in a space between a vehicle skin, i.e. a bumper covering 21, and the bumper transverse support 23. As illustrated in FIG. 1, the pedestrian protection device has a deformation element 1 with a first element 3 and a second element 5. The first element 3 and the second element 5 basically have a mutually displaceable or shiftable construction. In particular, the first element 3 can be displaced into the second element 5. The second element 5 is fixed to the bumper transverse support 23 and is rigidly connected with the latter. In addition, the deformation element 1 has a latching mechanism, which can restrict a displacement of the first element 3 with respect to the second element 5. The latching mechanism has a latching element 7 which, by way of a spring 9, can be prestressed and displaced in the transverse direction. In other words, the latching element 7 is arranged in/on the first element 3 so that it can be displaced transversely to the longitudinal direction of the vehicle. The latching mechanism further has a contact surface 13, which is constructed on an interior side of the second element 5, as well as a recess (a type of indentation) 11, which is also constructed in the second element 5, i.e. on its circumference.

Figure 2:
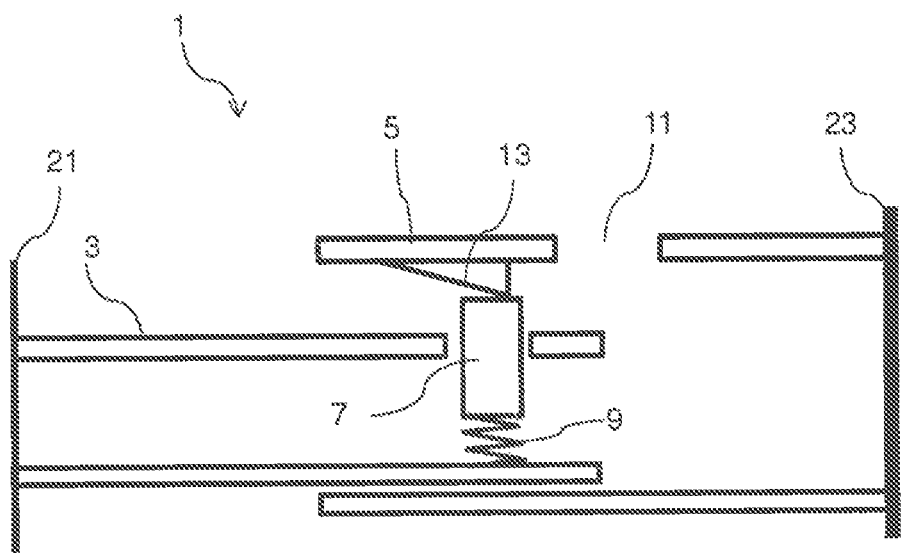
FIG. 2 is a schematic view of the pedestrian protection device according to the first embodiment of the present invention with a prestressed spring device.

The function of the deformation element 1 and particularly of the latching mechanism, will be described in the following with reference to FIGS. 2 to 4. FIG. 2 illustrates a condition in which the motor vehicle is subjected to a collision, and a collision load therefore acts by way of the bumper covering 21 upon the first element 3, whereby the first element 3 is displaced in the direction of the second element 5 and thereby of the bumper transverse support 23. In this case, the latching element 7 comes in contact with the contact surface 13, which is constructed on an interior side of the second element 5. The contact surface 13 is provided with a slope in the longitudinal direction of the vehicle, i.e. in the displacement direction of the first element 3, so that by an interaction between the latching element 7 and the contact surface 13, the latching element 7 is moved in the transverse direction in the course of the displacement and is thereby pressed against the spring device 9, so that this spring device 9 is prestressed. The spring device 9 may additionally have a damping device 20 (illustrated only schematically in FIG. 1 via dashed lines). FIG. 2 illustrates the condition in which a maximal prestressing of the spring 9 has been reached.

Figure 3:
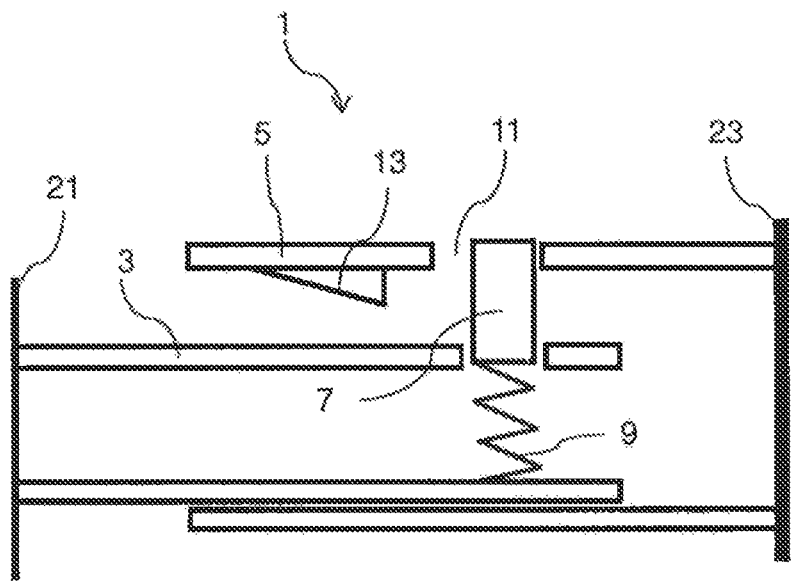
FIG. 3 is a schematic view of the pedestrian protection device according to the first embodiment of the present invention in a latched condition.

FIG. 3 shows a further course of the collision at a relatively slow displacement speed of the first element 3 and, therefore, a relatively low collision speed. After a maximal prestressing of the spring 9 and of the latching element 7, respectively, and a departing from of the contact surface 13, the latching element 7 is pressed in the transverse direction toward the exterior wall of the second element 5. In this case, the latching element 7 engages with a recess 11 in the wall of the second element 5. In this condition, the latching element 7 is in a form-locking engagement with the first element 3 as well as with the second element 5, so that a further displacement of the first element 3 relative to the second element 5 is blocked by the latching element 7. As soon as the condition illustrated in FIG. 3 has been reached, the deformation element 1 will act as a rigid element. In this condition, the deformation element 1 can transmit collision loads from the collision opponent directly to the bumper transverse support 23 and the crash structure of the motor vehicle situated behind the latter. When a specific collision load is exceeded, the deformation element 1 will fail by plastic deformation or brittle failure and will thereby absorb collision energy over a predefined failure distance of maximally the length of the deformation element 1 in the latched condition.

The deformation element 1 is particularly designed such that, at collision speeds of, for example, less than 4 km/h, it can transmit to the crash structure a collision load without deforming.

At a greater collision speed, which is, however, not yet relevant to a pedestrian protection, as, for example, a speed of between 4 km/h and 20 km/h, the deformation element 1 will be deformed at a defined load level, so that the deformation element 1 contributes to the reduction of collision energy, without any damage to, for example, components, such as a radiator, present behind the bumper transverse support 23.

Figure 4:
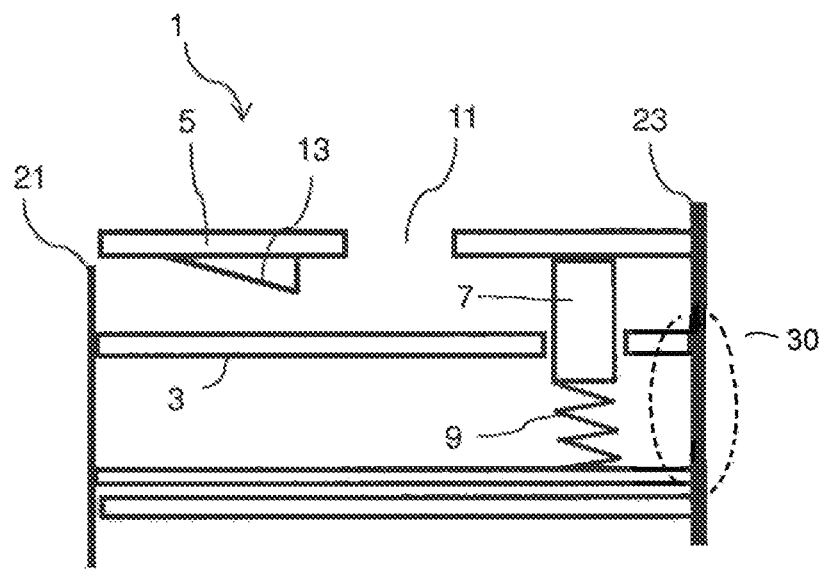
FIG. 4 is a schematic view of the pedestrian protection device according to the first embodiment of the present invention in an unlatched condition.

FIG. 4 illustrates a condition, in which no form-locking engagement of the latching element 7 and thereby of the first element 3 with the second element 5 has taken place, and therefore the first element 3 was displaced farther in the direction of the bumper transverse support 23 relative to the second element 5. The condition illustrated in FIG. 4 is reached at a higher displacement speed and, therefore, a higher collision speed. The deformation element 1 may, for example, be constructed such that, starting from a collision speed of approximately 20 km/h, no engagement takes place between the first element 3 and the second element 5, and the deformation element therefore, as a whole, clearly reacts in a softer manner over a longer deforming distance than in the case of the latched condition or engaged condition illustrated in FIG. 3.

As a result of the mass inertia of the latching element 7, the latching element 7 needs a certain time until it has been moved sufficiently far in the transverse direction. At the fast displacement speed of the first element 3, this has the result that the latching element 7 cannot engage in the recess 11 of the second element 5, so that the first element 3 can be displaced farther in the direction of the bumper transverse support 23 and the latching element 7 comes in contact with an interior side of the second element 5 and can be displaced along the interior side. No form-locking engagement will take place between the latching element and the second element 5. The first element may be displaceable into an opening 30 (only shown schematically in dashed lines in FIG. 4) of the transverse support 23.

Starting at the collision speed of, for example, 20 km/h, it is important that the front end of the motor vehicle front section, and particularly the bumper covering in connection with the deformation element 1, react sufficiently softly at a low deforming force level.

According to the invention, this is implemented by the described latching mechanism, which functions on the basis of a mass inertia of the latching element 7 while interacting with the spring force of the spring 9.

Thus, the conflicting objectives can be solved which, on the one hand, at very low collision speeds, requires a sufficiently high rigidity of the deformation element 1 or a sufficiently high deforming force level of the deformation element 1 and, at a slightly higher collision speed, ensures a sufficient pedestrian protection as a result of a low deforming force level.

With reference to FIGS. 5 to 9, the following is a description of a pedestrian protection device according to a second embodiment of the present invention. The pedestrian protection device of the second embodiment is functionally constructed analogous to the pedestrian protection device of the first embodiment but differs from the first embodiment in structural details, in which case, particularly such details with be explained in the following.

Figure 5:
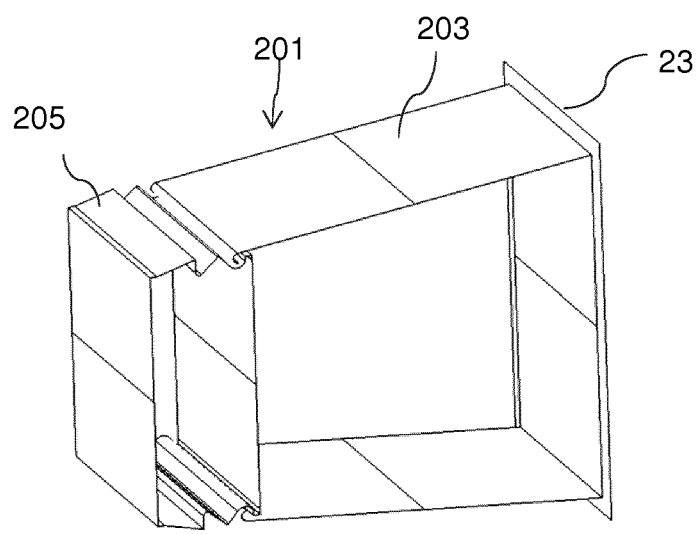
FIG. 5 is a schematic perspective view of a pedestrian protection device according to a second embodiment of the present invention.

FIG. 5 is a perspective view of the pedestrian protection device of the second embodiment having a deformation element 201, which is mounted on a forward side of a bumper transverse support 23 of a front end of a motor vehicle front section. The deformation element 201 is therefore arranged in a space between a bumper covering (not shown) and the bumper transverse support 23. The deformation element 201 has a first element 203 and a second element 205 which, in a latchable manner, can be displaced relative to one another. In particular, in the event of a frontal collision load, the second element 205 can be displaced in the direction of the bumper transverse support 23 and thereby in the direction of the first element 203. The first element 203 is arranged on the bumper transverse support 23.

Figure 6:
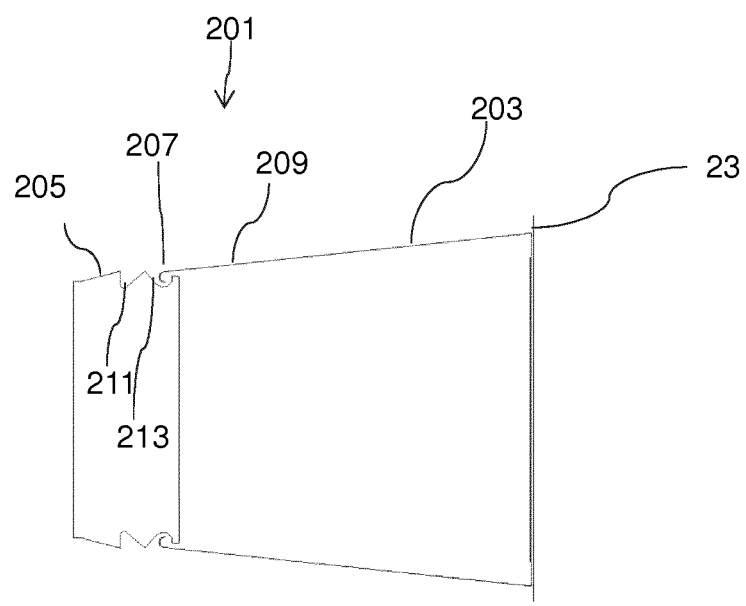
FIG. 6 is a schematic lateral view of the pedestrian protection device according to the second embodiment of the present invention.

As illustrated in FIG. 6, the first element 203 has two opposite walls 209, which extend essentially in the longitudinal direction of the vehicle, in which case, the following explanation refers only to the top wall 209, the bottom wall having a construction that is symmetrical thereto. A forward end 207 of the wall 209 is appropriately engaged with the second element 205. The forward end 207 of the wall acts as a latching element according to the present invention and has a hook-shaped curvature. The wall 209 itself further forms a spring device according to the invention, which can be elastically prestressed in a transverse direction. The second element 205 further has a recess 211 in which the latching element 207 can engage. Furthermore, the second element 205 has a contact surface 213 with a slope in the longitudinal direction of the vehicle, by way of which the forward end of the wall 207 as a latching element can be prestressed by way of the wall 209 as the spring device.

Figure 7:
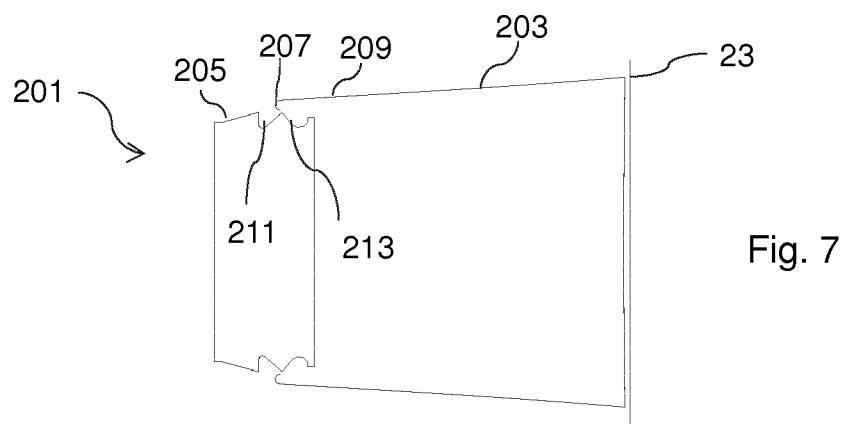
FIG. 7 is a schematic lateral view of the pedestrian protection device according to the second embodiment of the present invention in a condition in which a spring device is prestressed.

FIG. 7 illustrates a condition in which the latching element 207, as a result of the contact with the contact surface 213, was maximally prestressed by way of the wall and spring device 209. The condition shown in FIG. 7 is reached at the start of a frontal collision, during which the second element 205 is displaced in the direction of the first element 203 relative to the first element 203.

Figure 8:
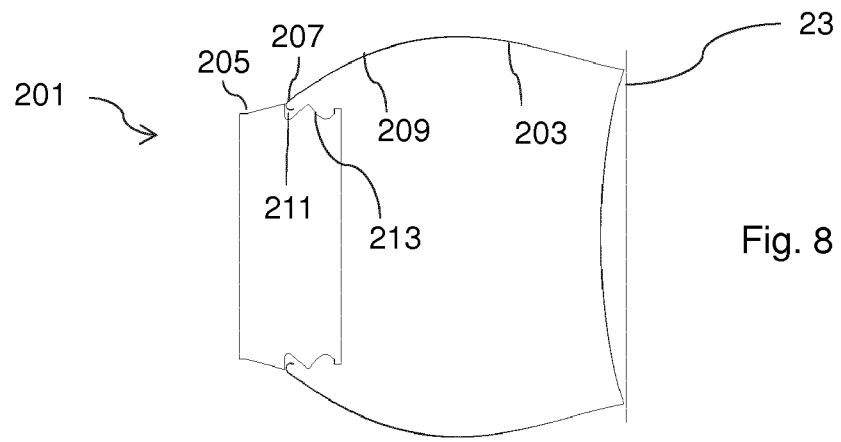
FIG. 8 is a schematic lateral view of the pedestrian protection device according to the second embodiment of the present invention in a latched condition.

FIG. 8 shows a condition in which the forward end of the wall 207, as latching element of the latching mechanism of the deformation element 201, at a relatively low speed of the second element 205, for example, less than 20 km/h, has arrived in a form-locking engagement with the recess 211 and thereby prevents a further displacement of the second element 205 relative to the first element 203.

In this case, an effect of the deformation element 201 is analogous to the deformation element 1 of the first embodiment. At a very low collision speed, the deformation element 201 acts in a sufficiently rigid manner and can thereby transmit collision loads directly to the crash structure situated behind the latter. At a slightly higher collision speed of, for example, 4 km/h to 20 km/h, the deformation element 201 is deformed by plastic and/or brittle failure at a defined force level, so that the deformation element 201 can contribute to a collision energy reduction.

Figure 9:
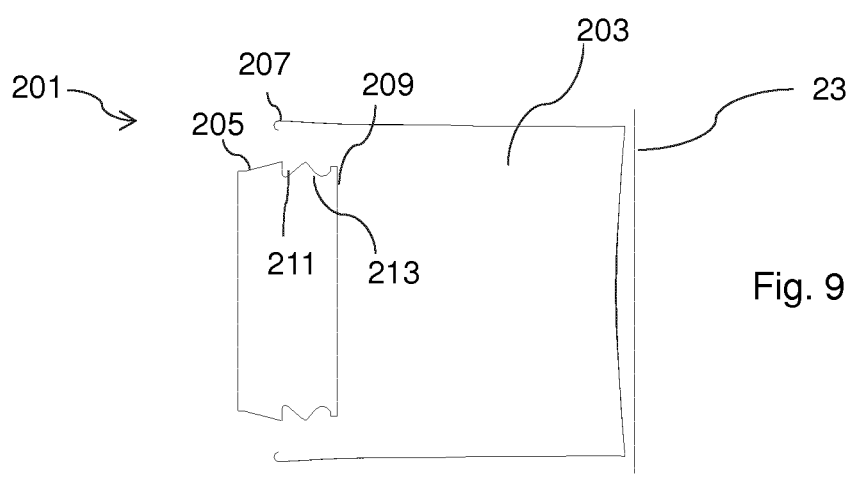
FIG. 9 is a schematic lateral view of the pedestrian protection device according to the second embodiment of the present invention in an unlatched condition.

In FIG. 9, a condition is illustrated in which the deformation element 201 is not in the engaged condition in the course of the collision. This condition is reached, starting at a defined displacement speed or collision speed of the second element 205 relative to the first element 203, at which a mass inertia of the latching element 207 has the result that it does not arrive in a form-locking engagement with the recess 211 of the second element 205. As a result, the second element 205 can be displaced at a lower load in the direction of the bumper transverse support 23, in which case, the walls of the first element 203 without an engagement with the second element 205 can be pressed away at a relatively low force level.

As a result, the deformation element 201 of the second embodiment, analogous to the deformation element 1 of the first embodiment, at a relatively high collision speed of, for example, more than 20 km/h, is softer for the benefit of a pedestrian protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pedestrian protection device for a motor vehicle, comprising:
   a bumper transverse support;
   a deformation element, which is arranged on an exterior side of the bumper transverse support, the deformation element having (i) a first element and a second element, which, in the event of a collision, are displaceable relative to one another in the direction of the bumper transverse support, and (ii) a mechanical latching mechanism having a latching element and a spring device, wherein:
   the mechanical latching mechanism, as a function of a displacement speed while utilizing a mass inertia of the latching element, is adjustable between a latched condition, in which a displacement of the first element relative to the second element is at least partially prevented, and, an unlatched condition, in which a displacement of the first element is permitted,
   the latching element and the spring device are constructed for interacting such that, via displacement of the first element and the second element relative to one another, the latching element is prestressed by the spring device before the latching element reaches the latched condition.

2. The pedestrian protection device according to claim 1, wherein the latching mechanism is latched below a collision speed threshold value and is unlatched when the collision speed threshold value is reached.

3. The pedestrian protection device according to claim 1, wherein in the case of a displacement of the first element and the second element relative to one another, the latching element engages in an indentation of the second element or first element such that a further displacement of the first element and of the second element relative to one another is prevented.

4. The pedestrian protection device according to claim 3, wherein the spring device is essentially relaxed in an idle state, and the latching mechanism has a contact surface by way of which the latching element is movable against the spring force of the spring device and is thereby prestressed, before the latching element reaches the indentation.

5. The pedestrian protection device according to claim 3, wherein the latching element, the spring device and the indentation are constructed to be interacting such that, in the case of a slow displacement of the first element and the second element relative to one another, the latching element engages in the indentation and, in the case of a fast displacement of the first element and the second element relative to one another, the latching element does not engage in the indentation.

6. The pedestrian protection device according to claim 1, wherein the spring device additionally has a damping device which appropriately dampens a movement of the latching element.

7. A pedestrian protection device for a motor vehicle, comprising:

a bumper transverse support;

a deformation element, which is arranged on the transverse support and whose deformation region is constructed on an exterior side of the transverse support, wherein the deformation element has:

(i) a first element and a second element, which, in the event of a collision, are displaceable relative to one another in the direction of the transverse support, and (ii) a mechanical latching mechanism which has a movable latching element and a spring device, the movable latching element being pre-stressable or being pre-stressed via the spring device, which latching element is arranged on the first element or the second element and is form-lockingly engageable with an indentation or a step at the other of the first element or the second element, and wherein the latching element and the spring device are constructed to be interacting such that, with a displacement of the first element and the second element relative to one another, the latching element is prestressable via the spring device before the latching element reaches the form-locking engagement with the indentation or the step.

8. The pedestrian protection device according to claim 7, wherein the latching mechanism has a contact surface which is arranged and constructed such that, during a relative movement of the first element and the second element relative to one another, the latching element is movable along the contact surface in contact with the contact surface against the spring force of the spring device and thereby is prestressable before the latching element reaches the form-locking engagement with the indentation or the step.

9. The pedestrian protection device according to claim 8, wherein the spring device, the latching element and the contact surface interact such that:

(i) at a high displacement speed, which is greater than or equal to a collision speed threshold value, when the latching element engages with the contact surface, a movement of the latching element along the contact surface is made possible and the latching element upon leaving the contact surface as a result of a mass inertia of the latching element jumps over the indentation or step, and therefore does not form-lockingly engage, and a further displacement of the first element and of the second element relative to one another is made possible, and (ii) at a low displacement speed, which is lower than the defined collision speed threshold value, during the engagement of the latching element with the contact surface, a movement of the latching element along the contact surface is made possible, and the latching element engages with the indentation or the step in a form-locking manner after leaving the contact surface at the low displacement speed.

10. The pedestrian protection device according to claim 9, wherein the contact surface is constructed in a slanted fashion with respect to a displacement direction of the first element and the second element relative to one another.

11. The pedestrian protection device according to claim 1, wherein a deformation region of the deformation element is constructed between a vehicle skin or a bumper covering and the transverse support.

12. The pedestrian protection device according to claim 7, wherein a deformation region of the deformation element is constructed between a vehicle skin or a bumper covering and the transverse support.

13. The pedestrian protection device according to claim 1, wherein the second element is fixed to the transverse support or is an integral component of the transverse support.

14. The pedestrian protection device according to claim 7, wherein the first element is fixed to the transverse support or is an integral component of the transverse support.

15. The pedestrian protection device according to claim 13, wherein the first element is displaceable into an opening of the transverse support.

16. The pedestrian protection device according to claim 1, wherein the deformation element is adapted to absorb, in a latched condition of the locking mechanism, collision energy by plastic deformation and/or brittle failure of the deformation element over a predefined deformation distance in a range of 60 mm to 110 mm.

17. The pedestrian protection device according to claim 16, wherein an energy absorption of the deformation element in the case of the unlatched condition of the latching mechanism is lower than an energy absorption of the deformation element in the case of the latched condition of the latching mechanism.

18. The pedestrian protection device according to claim 1, wherein the deformation element has a length of from 50 to 150 mm, and the first element and the second element are moveable relative to one another in an unlatched condition over a distance of from 60 to 110 mm.

19. The pedestrian protection device according to claim 1, wherein the first element is a cylindrical element, which is displaceable in a corresponding guide of the second element, and the latching element is mounted on the first element or the second element.

20. The pedestrian protection device according to claim 1, wherein the first element is an elastically deformable wall, which forms the spring device, having an end which forms the latching element.

\* \* \* \* \*